(12) United States Patent
Nakaminami et al.

(10) Patent No.: US 10,975,914 B2
(45) Date of Patent: Apr. 13, 2021

(54) MACHINE TOOL

(71) Applicant: DMG MORI CO., LTD., Nara (JP)

(72) Inventors: Masamitsu Nakaminami, Nara (JP); Haruki Ishiguro, Nara (JP)

(73) Assignee: DMG MORI CO., LTD., New Canaan, CT (US)

( * ) Notice: Subject to any disclaimer, the term of this patent is extended or adjusted under 35 U.S.C. 154(b) by 0 days.

(21) Appl. No.: 15/771,870

(22) PCT Filed: Jul. 4, 2016

(86) PCT No.: PCT/JP2016/069812
§ 371 (c)(1),
(2) Date: Apr. 27, 2018

(87) PCT Pub. No.: WO2017/077736
PCT Pub. Date: May 11, 2017

(65) Prior Publication Data
US 2019/0078622 A1   Mar. 14, 2019

(30) Foreign Application Priority Data

Nov. 5, 2015   (JP) .............................. JP2015-217894

(51) Int. Cl.
*F16C 41/00* (2006.01)
*G01D 5/12* (2006.01)
(Continued)

(52) U.S. Cl.
CPC .............. *F16C 41/007* (2013.01); *B23Q 1/70* (2013.01); *B23Q 17/10* (2013.01); *B23Q 17/22* (2013.01);
(Continued)

(58) Field of Classification Search
CPC ........ F16C 41/007; F16C 41/00; B23Q 17/22; B23Q 2017/001; B23Q 1/70; B23Q 17/10; G01D 5/22423; G01D 5/12
See application file for complete search history.

(56) References Cited

U.S. PATENT DOCUMENTS 4,667,156 A * 5/1987 Machino ............. B60B 27/0005
324/173
4,924,524 A * 5/1990 Kuhn ..................... B23Q 1/265
384/537
(Continued)

FOREIGN PATENT DOCUMENTS

CN    101961792 A    2/2011
CN    201807947 U    4/2011
(Continued)

OTHER PUBLICATIONS

Machine Translation of WO2009004199A2 (Year: 2009).*
(Continued)

*Primary Examiner* — Alan B Waits
(74) *Attorney, Agent, or Firm* — Ladas & Parry LLP

(57) ABSTRACT

There is provided a machine tool for suppressing the adverse effect of run-out of the rear end of a spindle on the rotation detection accuracy when processing a workpiece within a processing area. The machine tool includes a rotation driver, the spindle that is rotated by the rotation driver, a rotational angle detector that is provided to face a part forming the spindle in order to detect a rotational angle of the spindle, and at least two bearings that support the spindle and are arranged on a side of the processing area with respect to the rotation driver. The rotational angle detector is arranged at a position on the side of the processing area with respect to the rotation driver, the position being on the side of the processing area with respect to the bearings, on a side of the (Continued)

rotation driver with respect to the bearings, or between the bearings.

4 Claims, 4 Drawing Sheets

(51) Int. Cl.
*B23Q 17/10* (2006.01)
*G01L 5/12* (2006.01)
*B23Q 1/70* (2006.01)
*B23Q 17/22* (2006.01)
*G01D 5/244* (2006.01)
*B23Q 17/00* (2006.01)

(52) U.S. Cl.
CPC ......... *F16C 41/00* (2013.01); *G01D 5/24423* (2013.01); *G01L 5/12* (2013.01); *B23Q 2017/001* (2013.01)

(56) References Cited

U.S. PATENT DOCUMENTS

| | | | |
|---|---|---|---|
| 6,435,724 B1 * | 8/2002 | Louzon | ............... F16H 59/36 384/448 |
| 8,740,523 B2 | 6/2014 | Nakashima et al. | |
| 10,286,514 B2 | 5/2019 | Hasegawa et al. | |
| 2014/0171245 A1 * | 6/2014 | Klinglmair | ........... F16C 41/007 474/166 |

FOREIGN PATENT DOCUMENTS

| | | | |
|---|---|---|---|
| CN | 102235485 A | | 11/2011 |
| CN | 102407462 A | | 4/2012 |
| CN | 102452018 A | | 5/2012 |
| CN | 102785086 A | | 11/2012 |
| CN | 202571822 U | | 12/2012 |
| CN | 103231075 A | | 8/2013 |
| JP | H01252358 A | | 10/1989 |
| JP | 11-090756 A | | 4/1999 |
| JP | 2006064094 | * | 3/2006 |
| JP | 2012-045667 A | | 3/2012 |
| JP | 2012-067906 A | | 4/2012 |
| JP | 2010-217167 A | | 9/2012 |
| WO | 2009004199 A2 | * | 1/2009 |

OTHER PUBLICATIONS

Machine Translation of JP H01-252358 (Year: 1989).*
"JP International Search Report", dated Aug. 16, 2016 (Aug. 16, 2016) for JP Application No. PCT/JP2016/069812, 10pgs.
Japanese Office Action dated Jul. 9, 2019 of Japanese Patent Application No. 2015-217894 with English machine translation.
The Chinese Office Action dated Sep. 4, 2019 of Chinese Patent Application No. 201680062689.8 with its English translation.
Notice of Allowance dated Nov. 26, 2020 for Chinese Patent Application No. CN201680062689.8 and an English translation thereof.
Espacenet English abstract of CN 102785086 A.
Espacenet English abstract of CN 103231075 A.

* cited by examiner

MACHINE TOOL

CROSS-REFERENCE TO RELATED APPLICATION

This application is based upon and claims the benefit of priority from Japanese patent application No. 2015-217894, filed on Nov. 5, 2015, the disclosure of which is incorporated herein in its entirety by reference.

TECHNICAL FIELD

The present invention relates to a machine tool.

BACKGROUND ART

In the above technical field, patent literature 1 discloses a technique of arranging an encoder for detecting the rotational angle of a spindle near the rear end of the spindle.

CITATION LIST

Patent Literature

Patent literature 1: Japanese Patent Laid-Open No. 11-90756

SUMMARY OF THE INVENTION

Technical Problem

In the technique described in the above literature, however, since the encoder is located near the rear end of the spindle, run-out occurring near the rear end by the rotation of the spindle adversely affects the detection accuracy of the encoder.

The present invention enables to provide a technique of solving the above-described problem.

Solution to Problem

One example aspect of the present invention provides a machine tool for processing a workpiece within a processing area, comprising:
- a rotation driver;
- a spindle that is rotated by the rotation driver;
- a rotational angle detector that is provided to face a part forming the spindle in order to detect a rotational angle of the spindle; and
- at least two bearings that support the spindle and are arranged on a side of the processing area with respect to the rotation driver,
- wherein the rotational angle detector is arranged at a position on the side of the processing area with respect to the rotation driver, the position being on the side of the processing area with respect to the bearings, on a side of the rotation driver with respect to the bearings, or between the bearings.

Advantageous Effects of Invention

According to the present invention, it is possible to suppress the adverse effect of run-out of the rear end of the spindle on the rotation detection accuracy.

DESCRIPTION OF EXAMPLE EMBODIMENTS

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise.

First Example Embodiment

A machine tool 100 according to the first example embodiment of the present invention will be described with reference to FIG. 1. The machine tool 100 is a machining center that processes a workpiece within a processing area by rotating a spindle to which a tool is attached.

Figure 1:
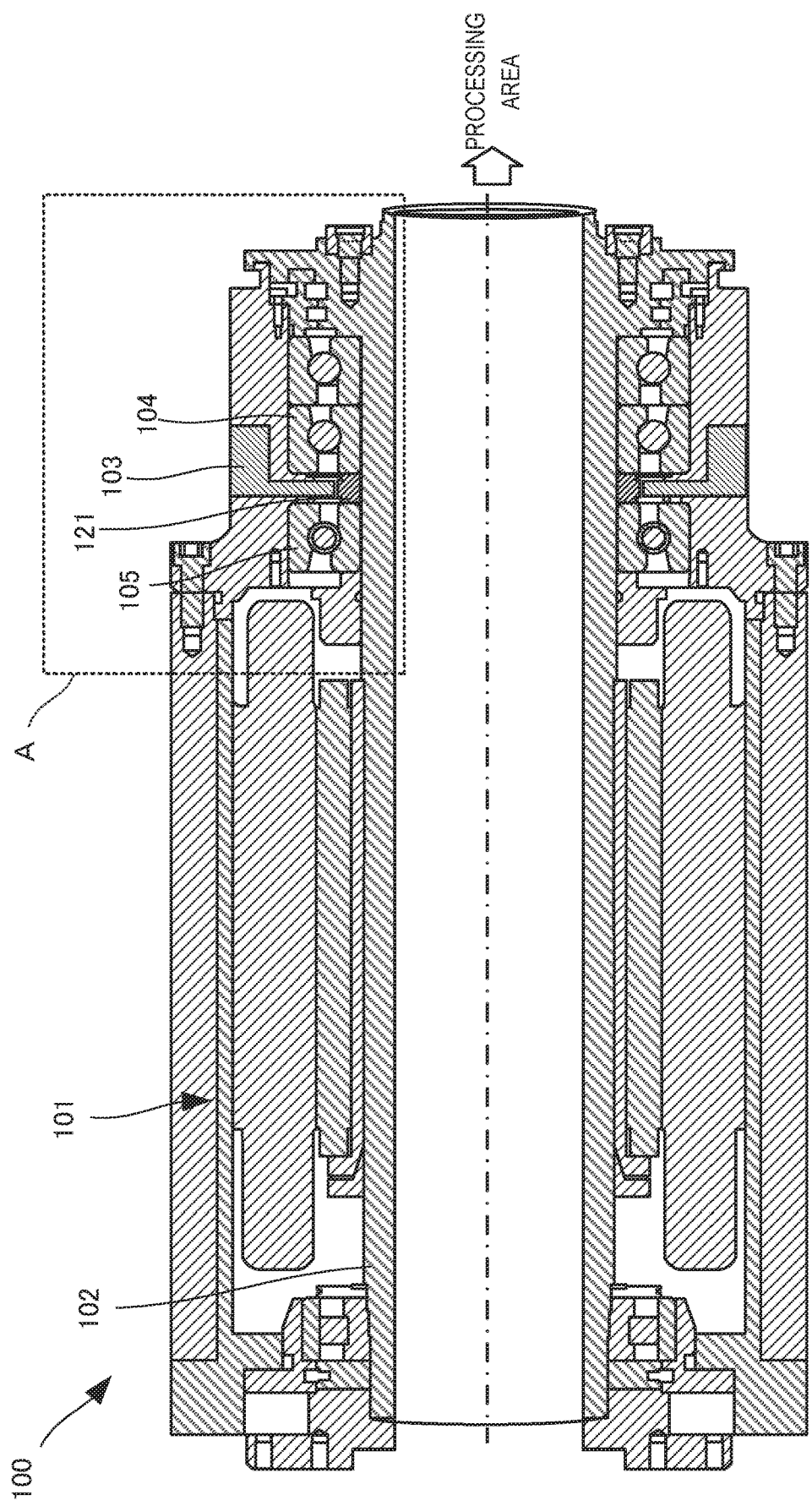
FIG. 1 is a view showing the arrangement of a machine tool according to the first example embodiment of the present invention.

As shown in FIG. 1, the machine tool 100 includes a rotation driver 101, a spindle 102 that is rotated by the rotation driver 101, a rotational angle detector 103 that detects the rotational angle of the spindle 102, and bearings 104 and 105 that support the spindle 102.

The rotational angle detector 103 is provided to face a part forming the spindle 102.

The bearings 104 and 105 are arranged on the processing area side with respect to the rotation driver 101.

The rotational angle detector 103 is arranged at a position between the bearings 104 and 105 on the processing area side with respect to the rotation driver 101.

More specifically, the rotational angle detector 103 is provided to face a bearing spacer 121 provided in the spindle 102, and detects the rotational angle of the spacer 121. An angle detection gear is formed on the surface of the bearing spacer 121.

Figure 2:
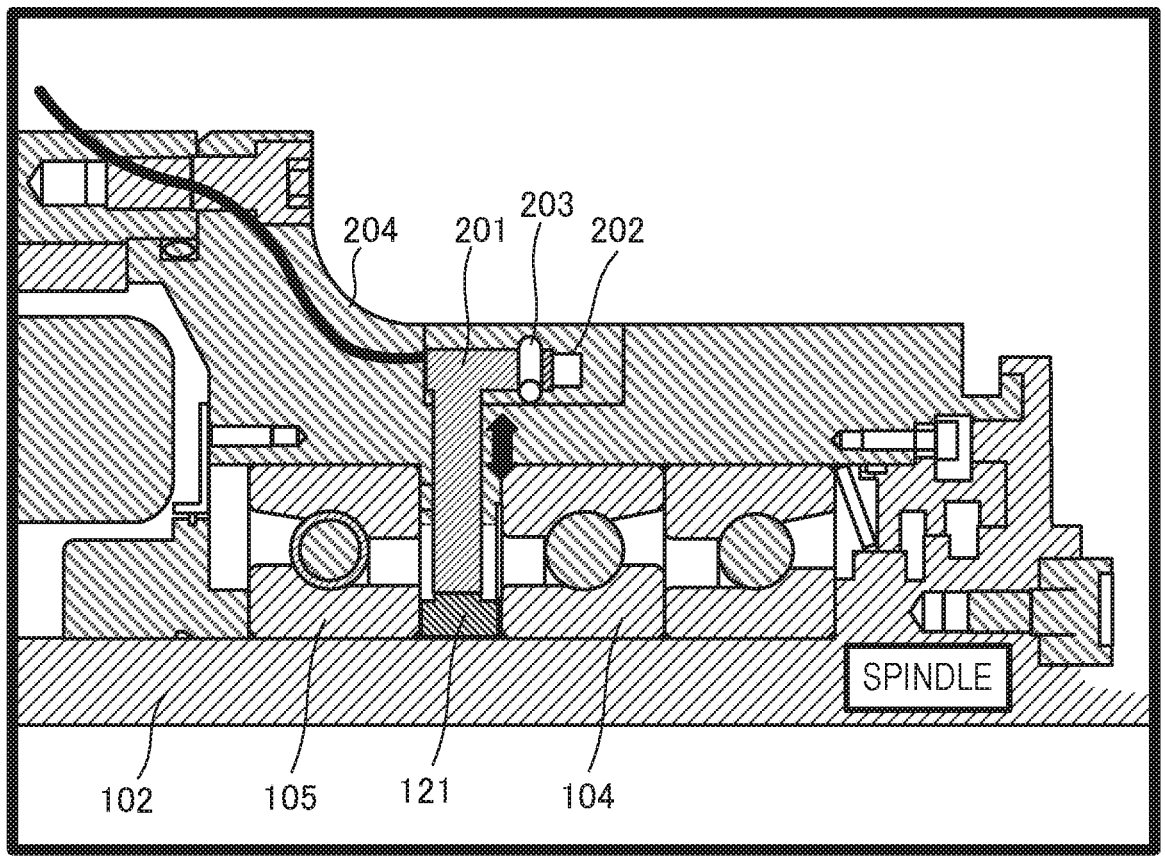
FIG. 2 is a partially enlarged view showing the arrangement of the machine tool according to the first example embodiment of the present invention.

FIG. 2 is an enlarged view showing a bearing peripheral region A in FIG. 1. As shown in FIG. 2, the bearing spacer 121 is integrated with a sensor gear, and a cylindrical encoder 201 of the rotational angle detector 103 is provided to face the bearing spacer 121. The outer ring spacer of the bearings is integrated with a front bearing housing. The cylindrical encoder 201 is provided with a fixing bolt 202 and an adjusting screw 203, and can be fixed to a front bearing housing 204 using the fixing bolt 202 after adjusting a gap between the spacer 121 and the encoder 201 in the outer circumferential direction using the adjusting screw 203.

With this arrangement, it is possible to suppress the adverse effect of run-out of the rear end of the spindle on the rotation detection accuracy, and make an attempt to improve indexing accuracy by fixing the encoder to the front bearing housing with high run-out precision. Since the angle detection gear is formed in the member that receives no large force from the rotation driver, rotational angle detection has no influence on the rotational accuracy of the spindle. Since the rotational angle detector 103 is attached to a spindle housing, it is possible to additionally attach the rotational angle detector 103 after assembling the spindle 102, thereby facilitating an assembly operation. Furthermore, an encoder head is readily replaced, thereby improving the maintenance. The number of parts of the structure of the rear portion (on the driving motor side) of the spindle can be reduced, thereby implementing downsizing. The sensor gear and the spacer can be integrated, thereby reducing the number of parts. In addition, a shape that readily undergoes gear processing improves the processing accuracy, thereby improving the indexing accuracy.

Second Example Embodiment

Figure 3:
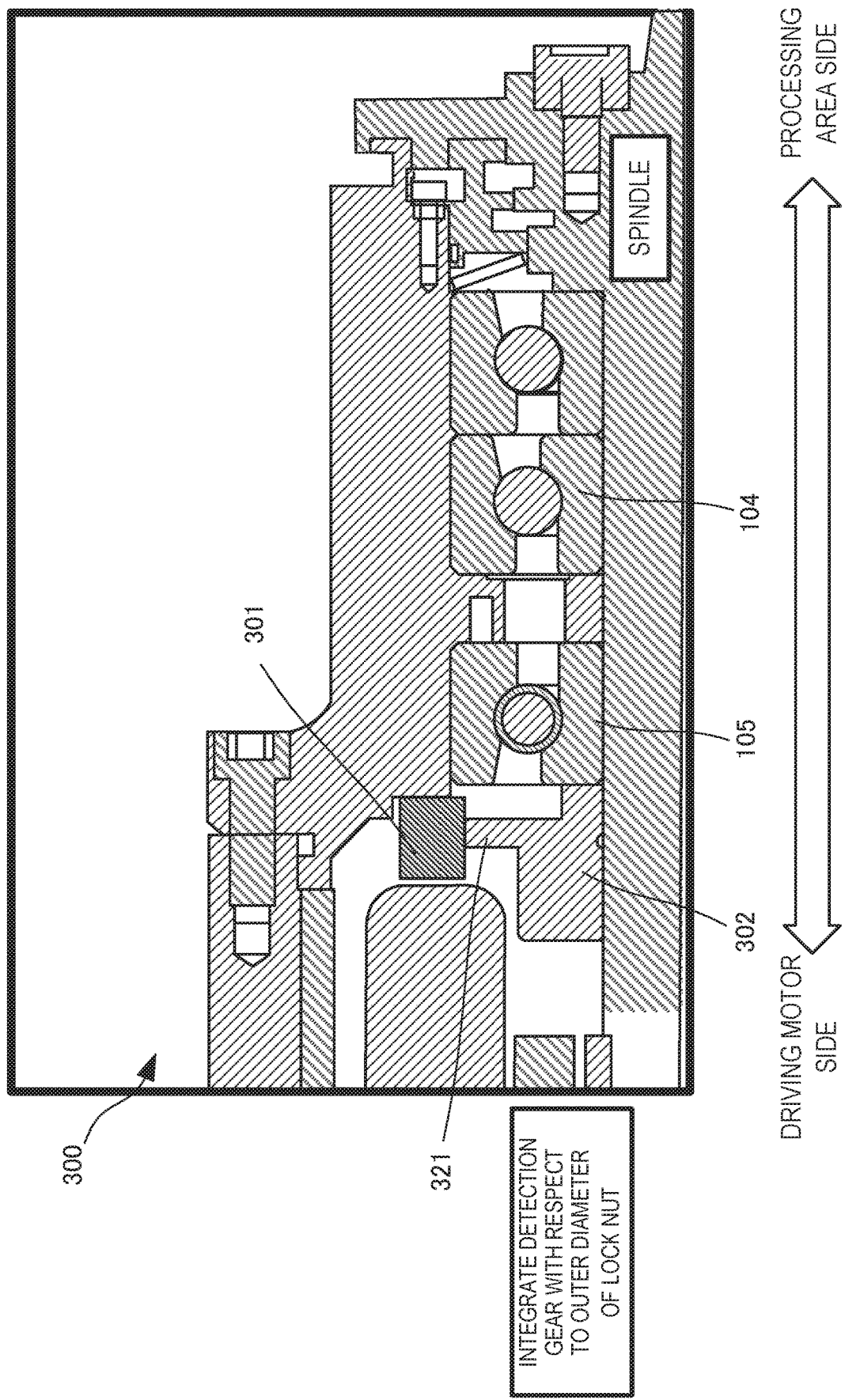
FIG. 3 is a partially enlarged view showing the arrangement of a machine tool according to the second example embodiment of the present invention.

A machine tool 300 according to the second example embodiment of the present invention will be described next with reference to FIG. 3. FIG. 3 shows another example of an enlarged view of the bearing peripheral region A in FIG. 1. The machine tool 300 according to this example embodiment is different from the above-described first example embodiment in that an encoder serving as a rotational angle detector 301 is provided on the rear side (driving motor side) of bearings 104 and 105. The remaining components and operations are the same as those in the first example embodiment. Hence, the same reference numerals denote the same components and operations, and a detailed description thereof will be omitted.

A detection gear 321 is integrally provided on the outer surface of a lock nut 302 that presses and fixes the bearing 104 toward the processing area. When the encoder 301 detects movement of the teeth of the detection gear 321, the rotational angle of the spindle 102 can be detected.

According to this example embodiment, similarly to the first example embodiment, it is possible to suppress the adverse effect of run-out of the rear end of the spindle on the rotation detection accuracy, and make an attempt to improve the indexing accuracy by fixing the encoder to a front bearing housing with high run-out precision. Since the angle detection gear is formed in the member that receives no large force from a rotation driver, rotational angle detection has no influence on the rotational accuracy of the spindle. The number of parts of the structure of the rear portion (on the driving motor side) of the spindle can be reduced, thereby implementing downsizing. The sensor gear and the lock nut can be integrated, thereby reducing the number of parts. In addition, a shape that readily undergoes gear processing improves the processing accuracy, thereby improving the indexing accuracy.

Third Example Embodiment

Figure 4:
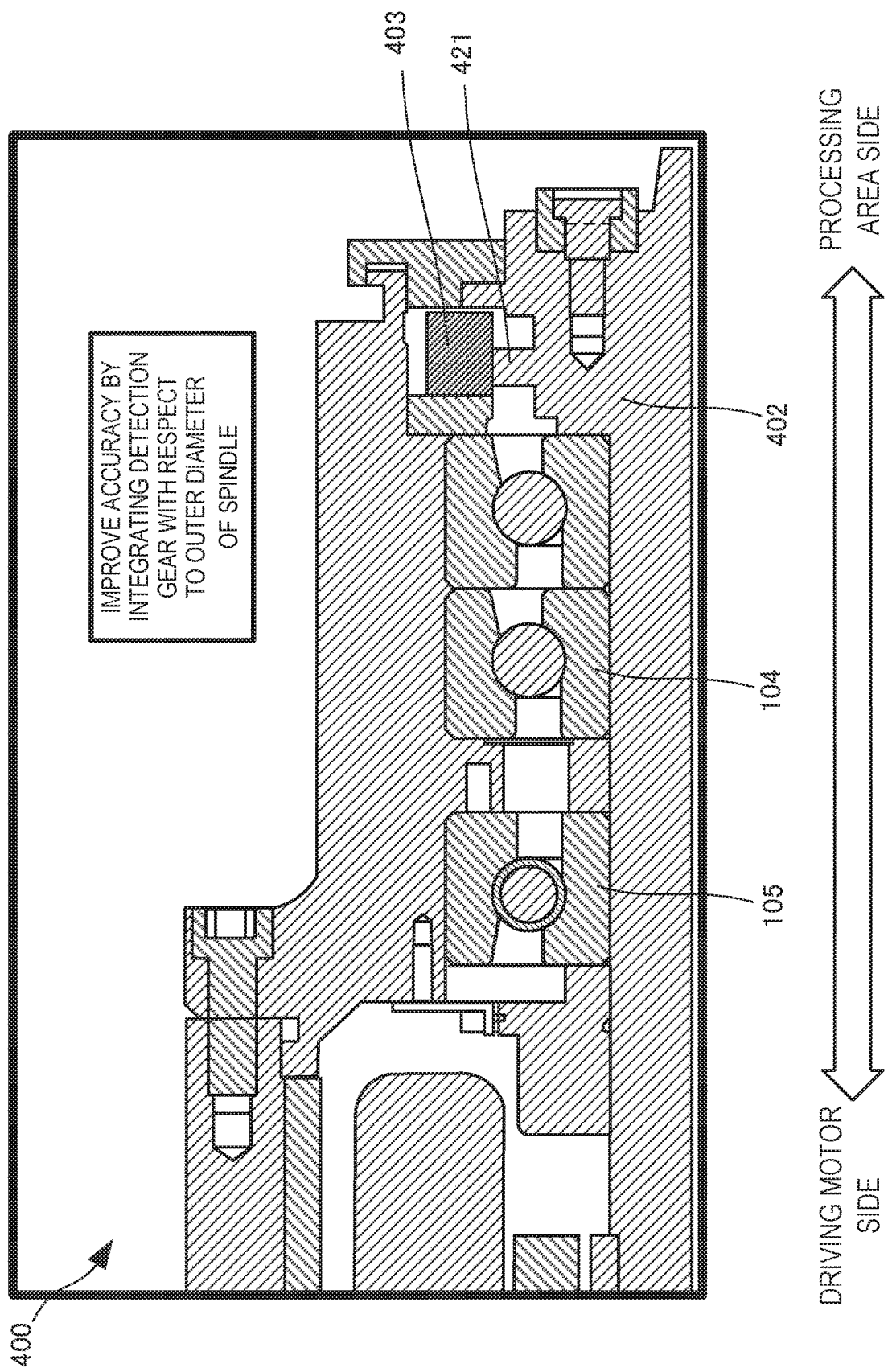
FIG. 4 is a partially enlarged view showing the arrangement of a machine tool according to the third example embodiment of the present invention.

A machine tool 400 according to the third example embodiment of the present invention will be described with reference to FIG. 4. FIG. 4 shows still other example of an enlarged view of the bearing peripheral region A in FIG. 1. The machine tool 400 according to this example embodiment is different from the above-described first example embodiment in that an encoder serving as a rotational angle detector 403 is provided on the front side (processing area side) of bearings 104 and 105. The remaining components and operations are the same as those in the first example embodiment. Hence, the same reference numerals denote the same components and operations, and a detailed description thereof will be omitted.

A detection gear 421 is integrally provided on the outer surface of a spindle 402 on the front side of the bearings 104 and 105. When the encoder 403 detects movement of the teeth of the detection gear 421, the rotational angle of the spindle 402 can be detected.

According to this example embodiment, similarly to the first example embodiment, it is possible to suppress the adverse effect of run-out of the rear end of the spindle on the rotation detection accuracy, and make an attempt to improve the indexing accuracy by fixing the encoder to a front bearing housing with high run-out precision. Since the angle detection gear is formed in the member that receives no large force from a rotation driver, rotational angle detection has no influence on the rotational accuracy of the spindle. The number of parts of the structure of the rear portion (on the driving motor side) of the spindle can be reduced, thereby implementing downsizing. The sensor gear and the spindle can be integrated, thereby reducing the number of parts. In addition, since the gear and the spindle are integrated, the processing accuracy is improved, thereby improving the indexing accuracy.

Other Example Embodiments

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims.

The invention claimed is:

1. A machine tool for machining a workpiece within a machining area, comprising:
    a rotation driver;
    a spindle that is rotated by said rotation driver;
    a rotational angle detector that is provided to face said spindle in order to detect a rotational angle of said spindle; and
    at least two bearings that are attached to said spindle and are arranged on a side of the machining area with respect to said rotation driver,
    wherein said rotational angle detector is arranged on the side of the machining area with respect to all of said at least two bearings, and
    wherein said rotation angle detector is directly opposite to an outer surface of said spindle.

2. The machine tool according to claim 1, wherein a gear is formed on an outer surface of said spindle, and said rotational angle detector detects the rotational angle of said spindle by counting concave/convex portions of the gear.

3. The machine tool according to claim 2, wherein said rotational angle detector is attached to a housing of said spindle.

4. The machine tool according to claim 1, wherein said rotational angle detector is attached to a housing of said spindle.

* * * * *